United States Patent [19]

Herring

[11] Patent Number: 4,507,165
[45] Date of Patent: Mar. 26, 1985

[54] ELASTOMER INSULATION COMPOSITIONS FOR ROCKET MOTORS

[75] Inventor: Liles G. Herring, Waco, Tex.

[73] Assignee: Hercules Incorporated, Wilmington, Del.

[21] Appl. No.: 418,311

[22] Filed: Sep. 15, 1982

[51] Int. Cl.³ ............................................. B29C 17/00
[52] U.S. Cl. ...................................... 156/191; 60/253; 102/289; 156/194; 156/287; 156/294; 264/3 R; 264/267
[58] Field of Search .............. 264/3 R, 267; 102/289; 60/253; 156/294, 172, 173, 175, 171, 287, 194, 190–192

[56] References Cited

U.S. PATENT DOCUMENTS

| | | | |
|---|---|---|---|
| 3,301,785 | 1/1967 | Ratliff et al. | 252/62 |
| 3,301,924 | 1/1967 | Bryant et al. | 264/3 |
| 3,311,013 | 3/1967 | Phipps | 102/289 X |
| 3,579,400 | 5/1971 | Kanyok et al. | 156/294 |
| 3,649,389 | 3/1972 | Barrow | 149/19 |
| 3,686,868 | 8/1972 | Chase et al. | 60/200 |
| 3,716,604 | 2/1973 | Dehm | 264/3 R |
| 3,813,308 | 5/1974 | Skidmore | 149/109 |
| 3,973,397 | 8/1976 | Chase et al. | 60/253 |
| 4,148,675 | 4/1979 | Rattle et al. | 156/294 X |
| 4,185,557 | 1/1980 | Gerrish, Jr. | 102/103 |
| 4,337,218 | 6/1982 | Byrd et al. | 102/289 X |

Primary Examiner—David A. Simmons
Attorney, Agent, or Firm—Edmund C. Ross, Jr.

[57] ABSTRACT

Non-asbestos elastomeric insulation materials for rocket motors are disclosed. The insulation materials comprise 100 parts by weight of a crosslinked elastomer polymer and between about 10 and 100 (preferably 15–75) parts by weight of an organic fiber selected from cotton flock, Sisal and a combination of cotton flock and Sisal. The insulation materials have notable erosion resistance and can be tailored to have thermal, mechanical and other properties of desired character. The organic fiber advantageously functions as a char forming, low density filler. Other ingredients such as silica, phenolic resin, polybutadiene etc. are included to enhance the utility of the insulation materials.

14 Claims, No Drawings

ELASTOMER INSULATION COMPOSITIONS FOR ROCKET MOTORS

BACKGROUND OF THE INVENTION

1. Field of Use

This invention relates to elastomeric insulation material especially suited for insulating rocket motors. This invention, more particularly, relates to such an elastomeric insulation material that is free of asbestos and, yet, performs as well or better than analogous insulation material containing asbestos. This invention, still more particularly, relates to such elastomeric insulation materials that contain char forming organic fiber as a low density filler thereof.

2. Prior Art

Elastomer insulation materials comprising asbestos have long been employed within rocket motor cases including such portions thereof as their blast tubes. This invention relates to insulation materials suited to this purpose but which are advantageously free of asbestos.

OBJECTS OF THE INVENTION

It is an object of this invention to provide low density, elastomeric insulation materials for rocket motors.

It is an object of this invention to provide such elastomeric insulation materials in which certain char forming organic particulate replaces asbestos.

It is an object of this invention to provide such asbestos free elastomeric insulation materials that can exhibit certain important properties as least as good as insulation materials having asbestos.

It is an object of this invention to provide methods for compounding and use of these elastomeric insulation materials.

These and other objects are achieved in accordance with this invention; these practices are described more fully in the following together with the present manner in which such objects are accomplished.

As used in the following description of this invention, the term "case wall insulation" refers to a layer or layers of material bonded to the internal wall of the rocket motor case to protect the case from the hot combustion processes occurring during the functioning of the rocket motor. Compositions A, B, C, D (Table V) are suitable materials for this application.

The term "blast tube insulation" in the following refers to material used to line the internal diameter of the blast tube of a rocket. The term "blast tube" refers to the conduit that conveys combustion products of the motor to the nozzle of the rocket. In some rocket motors, due to missile design, the nozzle cannot be connected directly to the rocket motor thereby requiring such a "blast tube." The blast tube lining protects this tube from the hot combustion gases of the rocket motor. Composition C in Table V is suitable for preparing certain blast tube liners.

The nature of specific blast tube insulators, as well as case wall insulators, depends on both mass flux, in the area of application, and burning duration of the rocket motor.

BRIEF SUMMARY OF THE INVENTION

The non-asbestos elastomeric insulation material of this invention comprises 100 parts by weight of a crosslinkable elastomer polymer and between about 10 and 100 (more preferably between about 15 and 75) parts by weight of a char forming organic particulate selected from cotton flock, Sisal or a combination of cotton flock and Sisal.

Among the crosslinkable elastomeric polymers suitable for this invention are an ethylene propylene diene monomer rubber (EPDM) and chlorosulfonated polyethylene rubber. The preferred organic fiber is cotton flock.

DETAILED DESCRIPTION OF THE INVENTION

The elastomer insulation materials of this invention serve such uses as case wall and blast tube insulation for rocket motors. In addition to crosslinkable elastomer polymer, the insulation materials comprise char forming organic particulates such as cotton flock, or Sisal or Sisal and cotton flock as a low density filler. Cotton flock is the preferred char forming organic fiber.

Cotton flock can be obtained from the textile and garment industries. Cotton flock is a short fiber cotton produced by chopping cotton fabric. Poorer grades of cotton flock is obtained from used fabrics.

Cotton flock suitable for this invention includes that with a density between about 1.5 and 1.7 grams per cubic centimeter, more preferably about 1.6 grams per cubic centimeter with mesh sizes ranging between about 10–200 mesh. Fiber diameters are between about 15 and 20 microns, e.g. 17 microns. Ordinarily, undyed or white cotton flock is preferred in this invention.

Generally, the cotton flock (or other such char forming organic fiber e.g. Sisal, a hard fiber obtained from plants of the Amaryllidacene family) is employed in amounts of between about 10 and 100 parts by weight per 100 parts by weight of the elastomer polymer (phr). A range between about 25 and 75 is particularly suitable for most embodiments of this invention.

Use of cotton flock in the insulation materials as discussed in the following yields materials with notable erosion resistance, in some instances even higher than that of analogous asbestos containing elastomer insulation materials. For example, the erosion rate may be as low as 18 mils/sec at flow rates of 1.49 lbs/sec. in.$^2$ compared to 28 mils/sec for the asbestos containing material at this flow rate.

This invention is not limited to any particular elastomer polymer. As long as the polymer is crosslinkable, the advantages of this invention should be obtainable. Exemplary polymers, however, are chlorosulfonated polyethylene and ethylene propylene diene monomer (EPDM), both of which are commercially available. Specific suitable EPDM polymers are available as Nordel ® 1040 from Dupont, Royalene ® 100 from Uniroyal, Epsyn ® 4506 from Copolymer and Vistalon ® 2504 from Exxon.

Preferred EPDM polymers have the following properties:

| | |
|---|---|
| Density, g/cc | 0.85 to 0.865 |
| Mooney, ML-4 @ 212 F. | 25 to 60 |
| Brittle Point, °F. | −90 F. |
| Hardness, Shore A | 30 to 90 |
| Tensile Strength (gumstock), psi | 500 to 1000 |

A specific suitable chlorosulfonated polyethylene is Hypalon LD-999 from Dupont.

The chlorosulfonated polymers used in this invention are preferably cured by a starch/magnesia curing system. Advantageously, the starch in this system also acts as a coolant in that it decomposes to water which, as known, has a high heat of vaporization. Between about 10 and 150 phr of the starch are employed with the chlorosulfonated polyethylene, more preferably between about 20 and 60 phr. The magnesium oxide in these embodiments is employed at between about 1 and 15 phr, more preferably about 1 and 10 phr.

In addition to the starch magnesia curing system, an accelerator is preferably employed with the chlorosulfonated polyethylene. Sulfur accelerators are preferred. An exemplary sulfur accelerator that is commercially available is Tetrone A from Dupont. The accelerator is typically used at between about 0.5 and 5 phr.

The EPDM polymer is preferably cured with a peroxide such as dicumyl peroxide or a t-butyl peroxy compound. These compounds are employed with the EPDM at between about 0.5 and 5 phr.

Silica is an exemplary inorganic filler which may be used in the insulation materials of this invention. Generally, the silica is employed at between about 5 and 80 phr, more usually between about 10 and 50 phr. Other inorganic fillers include antimony oxide which can be used in providing flame retardance to the insulation materials of this invention. The antimony oxide is preferably employed at between about 5 and 60 phr, more preferably about 10 and 35 phr.

In addition to inorganic particulate, the insulation materials may have additional organic additives to enhance the properties of the insulation. For example, chlorinated organic compounds can be used with antimony oxide or hydrated alumina to further enhance flame retardance of EPDM insulation materials. An exemplary chlorinated hydrocarbon for this purpose is Dechlorane ® flame retardant. The organic flame retardant is typically used at between about 10 and 80 phr, more preferably 15 and 65 phr.

Liquid polybutadiene is another organic material which is suitably employed in the elastomer materials of this invention. The liquid polybutadiene can increase erosion resistance as well as reduce stiffness in EPDM insulation materials of this invention. A typical level is between about 1 and 50 phr, more preferably 5 and 20 phr of the liquid polybutadiene. An exemplary liquid polybutadiene is Butarez NF from Phillips Petroleum. Moreover, such organic particulate as that derived from phenolic resins can be used advantageously as a replacement for silica. Such a replacement limits visible signature of the insulation material combustion products. The phenolic resin particulate is employed typically between about 30 and 120 phr for increasing char formation and enhance erosion resistance, particularly in chlorosulfonated polyethylene insulation materials of this invention. Exemplary phenolic resin products for this purpose are Resinox ® materials from Monsanto.

The elastomeric insulation materials of this invention may be from flexible to rigid using ingredients as above described. Moreover, even higher levels of particulate up to 50% weight or more can be used for modifying the modulus as desired for particular applications.

Set forth in Tables A, B and C below are exemplary formulations of insulation materials of this invention. Advantageously, specific cured elastomer insulators can be selected to have high erosion resistance comparable or better than their asbestos containing analogs as well as desirable thermal and mechanical properties including bonding capacity to standard propellants and bonding agents.

TABLE A

| Ingredient | Parts by Weight |
|---|---|
| Chlorosulfonated Polyethylene | 100 |
| Starch | 30–50 |
| Magnesia | 1–10 |
| Phenolic Resin | 80–120 |
| Cotton Flock | 30–50 |
| Accelerator | 0.5–5 |

Insulation materials of this embodiment A has superior erosion resistance.

TABLE B

| Ingredient | Parts by Weight |
|---|---|
| Chlorosulfonated Polyethylene | 100 |
| Magnesium oxide | 1–10 |
| Accelerator | 0.5–5 |
| Cotton Flock | 30–80 |
| Starch | 30–50 |
| Hydrated silica | 10–30 |

The insulation materials of this embodiment B have good erosion resistance and, advantageously, do not adsorb significant amounts of low polarity plasticizer from propellants containing the same.

TABLE C

| Ingredient | Parts by Weight |
|---|---|
| EPDM | 100 |
| Crosslinking Agent | 1–5 |
| Organic Flame Retardant | 20–60 |
| Inorganic Flame Retardant | 10–40 |
| Cotton Flock | 10–60 |
| Liquid Polybutadiene | 0–15 |

Insulations of this embodiment C are especially suited to case wall insulation in view of flame retarding and physical and thermal properties.

TABLE D

| Ingredient | Parts by Weight |
|---|---|
| EPDM | 100 |
| Crosslinking Agent | 1–5 |
| Cotton Flock | 20–80 |
| Hydrated Silica | 10–30 |

Insulators of this embodiment D of this invention are desirably employed as flexible low density insulators having superior erosion, mechanical and thermal properties as well as bond strengths.

Compounding of precursors to the insulation materials of this invention is at temperatures below those which cure the elastomer polymer and permit loss of compounding ingredients. Normally, these temperatures are below about 250° F. for EPDM compounds and below about 200° F. or even 150° F. for chlorinated polyethylene compounds. Conventional mixing and milling equipment can be used in the compounding.

The insulation material of this invention can be applied to motor cases by wrapping a "bladder mandrel" with calendered sheets of the insulator. The bladder is then inserted into the case and inflated. The inflated bladder forces the insulation against the motor case where it consolidates under pressure. The assembly, with inflated bladder, is then placed in an oven where the insulator is cured. Oven temperature of 300° F. to 350° F. are commonly used. For EPDM cured with peroxide, a minimum temperature of about 310° F. is usually required. After the insulator is cured, the bladder is removed leaving an insulated motor case. It is often advantageous to use primers on metal case walls to enhance bonding of the elastomeric insulator. Primers such as Chemlok 233 or a combination of Chemlok 205 and 234B (products of Hughson Division of Lord Corporation) can be used.

Alternative to the use of the aforedescribed inflatable mandrel technique, the insulation can be molded in matched metal dies for subsequent bonding to the rocket motor case. Moreover, the insulation formulations can be adapted to the process of U.S. Ser. No. 378,588 filed May 17, 1982 (incorporated herein by reference) which utilizes ribbon material in making precision rocket motor case insulation.

The following examples further illustrate aspects of this invention. The illustration by way of these examples is not intended to limit the scope of this invention, but, rather, to demonstrate its varied practice.

EXAMPLE 1

The following formulation (Table I) and procedures are suitable making an elastomer insulation material of this invention. The insulation material is for rocket motor case insulators.

TABLE I

| Components | Ingredients | phr | Weight Percent |
|---|---|---|---|
| 1 | Chlorosulfonated Polyethylene[a] | 100 | 45.87 |
| 2 | Magnesium Oxide[b] | 6.0 | 2.75 |
| 3 | Dipentamethylene thiurum hexa sulfide[c] | 2.0 | 0.92 |
| 4 | Cotton flock[d] | 50.0 | 22.94 |
| 5 | Corn starch[e] | 40.0 | 18.35 |
| 6 | Hydrated silica[f] | 20.0 | 9.17 |

[a]Hypalon LD-999 from E. I. Dupont
[b]Activated Powder, C. P. Hall Co.
[c]Tetron A from E. I. Dupont
[d]Grade 4128 from Danberg Chemical Co.
[e]American Maize Products Co.
[f]HiSil 233 from PPG Industries, Inc.

A first batch of insulation compound from the components of Table I is compounded on a cooled roll mill (Farrel Differential Roll Mill) as follows at temperatures below 200° F.:

| Order of Addition | Component | Milling Time[g] |
|---|---|---|
| First | 1 | 3-5 minutes |
| Second | 2 | 2-3 minutes |
| Third | 3 | 2-3 minutes |
| Fourth | 5 | 5-6 minutes |
| Fifth | 6 | 5-6 minutes |
| Sixth | 4 | 13-15 minutes |

[g]includes ingredient addition time

A second batch of insulation compound from the components of Table I is compounded as follows in a Baker-Perkins mixer with a final temperature below about 150° F.

| Order of Addition | Component | Mix Time |
|---|---|---|
| First | 1 | 10 |
| Second | 6 | 12 |
| Third | 4 | 12 |
| Fourth | 5 | 5 |
| Fifth | 2 and 3 | 15 |

After each of the batches is mixed and has cooled to room temperature, it is stored in polyethylene bags to prevent contamination.

The following properties are obtainable using the above compounds using either of these compounding procedures followed by a cure at 307° F. for thirty minutes.

| Physical Properties | Laboratory Scale Mixing | Manufacturing Scale Mixing |
|---|---|---|
| 1. Tensile Properties (ASTM D-412-66 after 30 minutes at 307° F.) | | |
| (i) Ultimate Tensile Strength, PSI | | |
| With Fibers | 1988 | 1700 |
| Against Fibers | 1476 | |
| (ii) Ultimate Elongation, percent | | |
| With Fibers | 30 | 40 |
| Against Fibers | 80 | |
| 2. Hardness, Share A (ASTM D-314-28) | 95 | |
| 3. Density, lb/in³ | 0.0498 | 0.0492 |

Cured elastomer of this example is suited for for use with rocket motor propellants having hydroxy or carboxy terminated polybutadiene as a binder material. Due to its stiffness, it is advantageously used as a bonded case wall insulation or, due to its low affinity to many plasticiziers, as a barrier film for other insulators. Post cure of ten (10) hours at 250° F. followed by grit blasting and then solvent cleaning (chloroethylene) is recommended for improved bonding. Specific applications may require a propellant/insulation bond compatibility study.

EXAMPLE 2

The following formulation (Table II) and procedures are suited for making elastomer material of this invention for rocket motor case insulation.

TABLE II

| Components | Ingredient | phr | Weight Percent |
|---|---|---|---|
| 1 | Chlorosulfonated Polyethylene[a] | 100 | 34.73 |
| 2 | Magnesium Oxide[b] | 6 | 2.08 |
| 3 | Starch[c] | 40 | 13.89 |
| 4 | Cotton flock[d] | 40 | 13.89 |
| 5 | Phenolic Resin[e] | 100 | 34.72 |
| 6 | Dipentamethylenethiurium-hexasulfide[f] | 2 | 0.69 |
| | | | 100.00 |

[a]Hypalon LD-999 from E. I. Dupont de Nemours
[b]Activated Powder, C. P. Hall Co.
[c]Cornstarch, American Maize Products Co.
[d]Grade 4128 from Danberg Chemical Co.
[e]Resinox RC 755 from Monsanto
[f]Sulfad from R. T. Vanderbilt or Tetrone A from E. I. Dupont de Nemours A batch of elastomer insulator compound is prepared on a cooled roll mill from the components of Table II at temperatures below 200° F. as follows:

| Order of Addition | Component | Milling Time[g] |
|---|---|---|
| First | 1 | 3-5 minutes |
| Second | 2 | 2-3 minutes |
| Third | 6 | 2-3 minutes |
| Fourth | 3 | 5-6 minutes |
| Fifth | 5 | 6-9 minutes |

-continued

| Order of Addition | Component | Milling Time[g] |
|---|---|---|
| Sixth | 4 | 13–15 minutes |

[g]Includes ingredient addition time.

After this batch is mixed and cooled to room temperature, it is stored in polyethylene bags to prevent contamination.

The following properties are obtainable from curing compounds of this Example 2 at a termperature of 307° F. for thirty minutes.

| Physical Properties | Laboratory Mixed |
|---|---|
| 1. Tensile Properties (ASTM D-412-66 after 30 minutes at 340 F.) | |
| Ultimate Tensile Strength, psi With Fibers | 2811 |
| Ultimate Elongation, percent With Fibers | 20 |
| 2. Hardness, Shore A (ASTM D-314-28) | 95 |
| 3. Density, lb/in$^3$ | 0.0472 |

The cured elastomer of this example is suited for use in rocket motors having either hydroxy terminated or carboxy terminated polybutadiene bound propellants. Due to its stiffness, the resultant elastomer material is best utilized as a bonded case wall insulation or, blast tube liner. A post cure of ten (10) hours at 250° F. is recommended. Specific applications may require propellant/insulation bond compatibility studies.

EXAMPLE 3

The following formulation (Table III) is used in making an elastomer insulation material of this invention.

TABLE III

| Components | Ingredient | phr | Weight Percent |
|---|---|---|---|
| 1 | EPDM[a] | 100.0 | 51.95 |
| 2 | 2,5-dimethyl-2,5-di(t-butylperoxy)hexane[b] | 2.5 | 1.30 |
| 3 | Flame retardant[c] | 40.0 | 20.78 |
| 4 | Antimony Oxide[d] | 20.0 | 10.39 |
| 5 | Cotton Flock[e] | 20.0 | 10.39 |
| 6 | Linear Polybutadiene[f] | 10.0 | 5.19 |
| | | | 100.00 |

[a]Nordel 1040 from E. I. Dupont
[b]Varox from R. T. Vanderbilt
[c]Dechlorane Plus 515 from Hooker Chemical
[d]Mil-A-51312, Harshaw Chemical Co.
[e]Grade 4128 from Danberg Chemical Company
[f]Butarez N. F. from Phillips Petroleum Co.

A first batch of insulation precursor material from the components in Table III is compounded at temperatures below 250° F. on a cooled roll mill as follows:

| Order of Addition | Component | Milling Time[g] |
|---|---|---|
| First | 1 | 1–3 minutes |
| Second | 2 | 2–3 minutes |
| Third | 3 | 10–12 minutes |
| Fourth | 4 | 5–6 minutes |
| Fifth | 6 | 6–9 minutes |
| Sixth | 5 | 13–15 minutes |

[g]Includes ingredient addition time.

A second batch is compounded in a Baker Perkins Mixer from the components of Table III at temperatures below 250° F. as follows:

| Order of Addition | Component | Mix Time (Minimum) |
|---|---|---|
| First | 1 | 10 minutes |
| Second | 3 | 15 minutes |
| Third | 4 | 5 minutes |
| Fourth | 6 | Until well incorporated |
| Fifth[1] | 5 | 16 minutes |
| Sixth | 2 | 15 minutes |

[1]Cotton Flock may be added incrementally to facilitate incorporation into the mix.

The following physical properties are obtainable from curing either of the above compounds of this Example 3 at a temperature of 340° F. for thirty (30) minutes.

| Physical Properties | Laboratory Mixed |
|---|---|
| 1. Tensile Properties (ASTM D-412-66 after 30 minutes at 340 F.) | |
| Ultimate Tensile Strength, psi With Fibers | 484 |
| Ultimate Elongation, percent With Fibers | 63 |
| 2. Hardness, Shore A (ASTM D-314-28) | 70 |
| 3. Density, lb/in$^3$ | 0.0413 |

The cured elastomer of this example may be used for floaters, case liner or insulation material for rocket motors. A post cure of ten (10) hours at 250° F. is recommended. Specific applications may require study of compatibility with propellant formulations. Epoxy based and polybutadiene-based adhesives may be used for adherence to steel or to the cured elastomer itself. In addition, the uncured elastomer can be used as a binder in such circumstances.

EXAMPLE 4

The following formulation (Table IV) and procedures are suited for making an elastomer insulation material of this invention.

TABLE IV

| Component | Ingredients | phr | Weight Percent |
|---|---|---|---|
| 1 | EPDM[a] | 100.0 | 57.971 |
| 2 | 2,5-dimethyl-2,5-di(t-butylperoxy)hexane[b] | 2.5 | 1.449 |
| 3 | Cotton Flock[c] | 50.00 | 28.986 |
| 4 | Hydrated silica[d] | 20.00 | 11.594 |
| | | | 100.000 |

[a]Nordel 1040 from DuPont
[b]Varox from R. T. Vanderbilt
[c]Grade 4128 from Danberg Chemical Co.
[d]HiSil 233 from PPG Industries, Inc.

A first batch is compounded from the components of Table IV on a cooled roll mill (Farrel Differential Roll Mill) at temperatures below 200° F. as follows:

| Order of Addition | Component | Milling[g] |
|---|---|---|
| First | 1 | 1–3 minutes |
| Second | 2 | 2–3 minutes |
| Third | 3 | 10–12 minutes |

-continued

| Order of Addition | Component | Milling[g] |
|---|---|---|
| Fourth | 4 | 13–15 minutes |

[g]Includes ingredient addition time.

A second batch from the components of Table IV is compounded in a Baker-Perkins mixer with a final temperature below 200° F.

| Order of Addition | Component | Mix Time, (Minimum) |
|---|---|---|
| First | 1 | 10 minutes |
| Second[1] | 3 | 12 minutes |
| Third[1] | 4 | 30 minutes |
| Fourth | 2 | 15 minutes |

[1]HiSil 233 and Cotton Flock are added incrementally to facilitate incorporation into the mix.

The following physical properties are obtainable from curing either of the above compounds of this Example 4 at temperatures of about 340° F. for thirty minutes.

| Physical Properties | Laboratory Mixed |
|---|---|
| 1. Tensile Properties (ASTM D-412-66 after 30 minutes at 340 F.) | |
| Ultimate Tensile Strength, psi | 642 |
| With Fibers | |
| Against Fibers | |
| Ultimate Elongation, percent | 40 |
| With Fibers | |
| Against Fibers | |
| 2. Hardness, Shore A (ASTM D-314-28) | 80 |
| 3. Density, lb/in$^3$ | 0.038 |

The cured elastomer of this example may be used as floater, case liner or insulation material for rocket motor cases. Both carboxy terminated and hydroxy terminated polybutadiene bound propellants can be used with the elastomer material of this example. Adhesives suited for binding the elastomer material to steel or itself include epoxies, Butarez CTL-based adhesives. The formulation is also self binding during cure. A post cure of ten (10) hours at 250° F. is recommended before contact with propellant. Specific propellant formulations may require insulator/propellant bond compatibility studies.

TEST RESULTS

Table V below illustrates results obtainable from cured elastomer materials made in accordance with this invention and prior art compositions containing asbestos. In Table V, formulation A is compounded using procedures of Example 3, B procedures of Example 4, C procedures of example 2 and D procedures of Example 1. Formulations E through H are conventional elastomer materials used in rocket motor cases and contain asbestos.

TABLE V

EROSION, MECHANICAL, THERMAL PROPERTIES AND DENSITY OF EXEMPLARY INSULATORS COMPARED WITH ASBESTOS COMPOSITIONS

| Ingredient, phr | A | B | C | D | E | F | G | H |
|---|---|---|---|---|---|---|---|---|
| EPDM[a] | 100.0 | 100.0 | | | 100.0 | 100.0 | 100.0 | |
| 2,5-dimethyl-2,5(di-t-butyl-peroxy)-hexane[b] | 2.5 | 2.5 | | | 2.5 | 2.5 | 7.5 | |
| Flame retardent[c] | 40.0 | | | | 40.0 | 40.0 | | |
| Antimony Oxide | 20.0 | | | | 20.0 | 20.0 | | |
| Polybutadiene[d] | 10.0 | | | | | 10.0 | | |
| Cotton Flock | 20.0 | 50.0 | 40.0 | 50.0 | | | | |
| Silica[e] | | 20.0 | | 20.0 | | | | |
| Chlorosulfonated Polyethylene[f] | | | 100.0 | 100.0 | | | | |
| Magnesia | | | 6.0 | 6.0 | | | | |
| Starch | | | 40.0 | 40.0 | | | | |
| Dipentamethylene thiurum hexa sulfide[g] | | | 2.0 | 2.0 | | | | |
| Phenolic resin[h] | | | 100.0 | | | | | |
| Asbestos[i] | | | | | 20.0 | 20.0 | 100.0 | ≅100.0 |
| Phenolic Resin | | | | | | | | ≅100.0 |
| Asbestos Felt | | | | | | | | ≅300.0 |
| Polybutadiene[j] | | | | | | | 10.0 | |
| Erosion/Decomposition, mils/sec | | | | | | | | |
| 0.245 lbs/sec in$^2$* | 10 | 8.5 | 7 | 10 | 11 | 12 | | 7 |
| 0.141 lbs/sec in$^2$** | 13 | 9–11 | 5 | 13 | 11 | 14 | | 11 |
| 1.49 lbs/sec in$^2$** | 40 | 400 | 18 | 62 | 56 | — | 28.0 | 28.0 |
| Mechanical Properties (77 F., 20 in./min X-Head) | | | | | | | | |
| $\epsilon m$, % | 63 | 40 | 20 | 30 | 63 | 284 | 29 | |
| $\sigma m$, psi | 484 | 642 | 2710 | 1988 | 360 | 455 | 2279 | 38000 |
| Density, lb/in$^3$ | 0.0413 | 0.0387 | 0.0457 | 0.0492 | | 0.0428 | 0.046 | 0.061 |
| Rex Hardness | 70 | 80 | 95 | 95 | 80 | 75 | 85 | 100 |

TABLE V-continued

EROSION, MECHANICAL, THERMAL PROPERTIES AND DENSITY OF EXEMPLARY INSULATORS COMPARED WITH ASBESTOS COMPOSITIONS

| | A | B | C | D | E | F | G | H |
|---|---|---|---|---|---|---|---|---|
| Thermal Properties Expansion, in./in./deg F. $\times 10^{-5}$ | | | | | | | | |
| 0 | 7.7 | 6.2 | 2.3 | 4.7 | — | 9.1 | — | — |
| 1 | 25.1 | 24.5 | 14.8 | 16.7 | 24.0 | 27.3 | — | 27.0 |
| Conductivity, BTU/hr(ft$^2$)/deg F/ft | 0.13 | 0.10 | 0.11 | 0.15 | 0.13 | 0.12 | 0.2 | 0.16–0.3 |
| Tg deg F | −74 | −62 | 3 | 14 | — | −72 | | 77 |

*From two-inch apparatus
**From six-inch material test motor
(a) Nordel 1040 ®
(b) Varox ®
(c) Dechlorane Plus ®
(d) Butarez NF ®
(e) HiSil 233 ®
(f) Hypalon LD-999 ®
(g) Sulfads ®
(h) Rexinox RC 755 ®
(i) Plastibest 20 ®
(j) Butarez CTL II ®

Table VI shows properties of elastomers made generally using procedures of Example 3 against asbestos containing analogs. The formulations listed in Table VI, i.e. A1, A2, A3, A4, A5 and A6, are variants of formulation A of Table V.

TABLE VI

| | A1 | E1 | A2 | A3 | A4 | A5 | E2 | A6 |
|---|---|---|---|---|---|---|---|---|
| Ingredient, phr | | | | | | | | |
| EPDM$^{(a)}$ | 100.0 | 100.0 | 100.0 | 100.0 | 100.0 | 100.0 | 100.0 | 100.0 |
| 2,5-dimethyl-2,5-(di-t-butyl-peroxy hexane$^{(b)}$ | 2.5 | 2.5 | 2.5 | 2.5 | 2.5 | 7.5 | 2.5 | 2.5 |
| Sisal, ¼" Fiber | 20.0 | — | — | 80.0 | — | — | — | — |
| Cotton Flock | — | — | 20.0 | — | 20.0 | 20.0 | — | — |
| Antimony Oxide | 20.0 | 20.0 | 20.0 | 20.0 | 20.0 | 20.0 | 20.0 | 20.0 |
| Flame Retardent$^{(c)}$ | 40.0 | 40.0 | 40.0 | 40.0 | 40.0 | 40.0 | 40.0 | 40.0 |
| Polybutadiene$^{(d)}$ | 10.0 | 10.0 | 10.0 | — | — | 10.0 | — | 10.0 |
| Asbestos | — | 20.0 | — | — | — | — | 20.0 | — |
| Cotton Flock + A-172 (Silane Coupling Agent) | — | — | — | — | — | — | — | 20.0 |
| Erosion/Decomposition (Mils/Sec) | 11 | 12 | 10 | 14 | 17 | 7.5 | 11 | 9 |
| Mechanical Properties (77 F., 20 in./min X-head) | | | | | | | | |
| εm, % | 40 | 284 | 63 | 20 | 60 | 40 | 63 | 73 |
| σm, psi | 313 | 455 | 484 | 901 | 359 | 878 | 360 | 592 |

(a) Nordel 1040 ®
(b) Varox ®
(c) Dechlorane Plus ®
(d) Butarez NF ®

Table VII shows properties of elastomers made generally in accordance with procedures of Example 4. The formulations listed in Table VII, i.e. B1, B2, B3, B4 and B5, are variants of formulation B in Table V.

TABLE VII

| | B1 | B2 | B3 | B4 | B5 |
|---|---|---|---|---|---|
| Ingredient, phr | | | | | |
| EPDM$^{(a)}$ | 100.0 | 100.0 | 100.0 | 100.0 | 100.0 |
| 2,5 dimethyl-2,5 (dit-butylperoxy)hexane$^{(b)}$ | 2.5 | 2.5 | 2.5 | 2.5 | 2.5 |
| Silica$^{(c)}$ | 35.0 | 35.0 | 20.0 | 20.0 | 40.0 |
| Cotton Flock | — | — | 10.0 | 50.0 | 50.0 |
| Acetylene Black (100% Comp.) | 0.5 | — | | | |
| Sym.di-beta-napthyl-p-phenylenediamine$^{(d)}$ | | 3.0 | | | |
| Erosion/Decomposition (Mils/Sec)* | 12.0 | 15.0 | 11.0 | 8.5 | 8.3 |
| Mechanical Properties (77 F., 20 in./min X-Head) | | | | | |
| εm, % | 845 | 1258 | 540 | 40 | 30 |
| σm, psi | 1728 | 812 | 697 | 642 | 898 |

*0.245 lb/sec-in$^2$
(a) Nordel 1040 ®
(b) Varox ®
(c) HiSil 233 ®
(d) Agerite White ®

Table VIII shows properties of elastomers made generally in accordance with Example 2 against analogous asbestos containing compositions. The formulations listed in Table VIII, i.e. C1, C2, C3, C4, C5 and C6 are variants of formulation C in Table V.

ples of SRL is the breaking up of the stresses, normal to the case bonded propellant grains in a rocket motor, into small stress columns that independantly undergo triaxial stress, thus reducing stress-strain fields in the propellant grain.

A SRL has five (5) components. These components are: an insulator, column material (i.e. stress relieving material), separator sheet, migration barrier and a liner that promotes bonding between propellant and insulator materials. Typically, the columns are sized to give between about 30 and 80 percent unbonded area, the number, size and placement determined from stress analysis of the grain to be supported by the SRL.

Proceeding from the case wall to propellant, the SRL of this example has (a) a first insulator, (b) either column material or separator sheet, (c) a second insulator (d) a migration barrier; and (e) a liner. The column material is disk like in confirguration. The first and second insulators comprise material formulated as in Example 4; this insulation material formulation is modified to yield a soft column material from data in Table XI below.

TABLE XI

COMPOSITIONS OF COLUMN MATERIAL CANDIDATES RESULTING FROM MODIFICATIONS OF COMPOSITIONS OF EXAMPLE 4

| Ingredients, phr | Exemplary | 4A | 4B | 4C | 4D |
|---|---|---|---|---|---|
| Nordel 1040 (EPDM) | 100.0 | 100.0 | 100.0 | 100.0 | 100.0 |
| Varox | 2.5 | 2.5 | 2.0 | 2.0 | 2.0 |
| Cotton Flock | 50.0 | 10.0 | 10.0 | 10.0 | 10.0 |
| HiSil 233 | 20.0 | 20.0 | 20.0 | 15.0 | 10.0 |
| Butarez NF | — | — | 20.0 | 20.0 | 20.0 |
| Mechanical Properties (20 in./min X-Head Speed, 77 F.) Parallel to Fibers | | | | | |
| $\epsilon_m$, % | 40 | 540 | 680 | 700 | 640 |
| $\sigma_m$, psi | 642 | 697 | 493 | 405 | 444 |
| Perpendicular to Fibers | | | | | |
| $\epsilon_m$, % | — | — | 650 | 690 | 680 |
| $\sigma_m$, psi | — | — | 443 | 405 | 442 |

Testing of the materials of Table XI results in selection of composition 4D for the desired material of the support column.

The separator sheet is made from an elastomeric silicone material (Cohrlastic® 9360, available from Connecticut Hard Rubber Company) The Cohrlastic® material can vary in thickness, dependent on SRL requirements, but typically ranges between about 0.060 and 0.25 inches, e.g. 0.189 inches.

Two materials are evaluated as the barrier material for the migration barrier. The materials are a composition prepared as in Example 1 and Tuftane TF-310, a polyester-polyurethane from B. F. Goodrich. Testing shows these materials function essentially equivalently as migration barriers.

The liner is chosen to be a composition as set forth in Table XII below

TABLE XII

| COMPOSITION OF LINER A-128A | |
|---|---|
| Ingredient | Wt. Percent |
| Masterbatch | 77.00 |
| R-45M[a] | 65.00 |
| Carbon Black (FEF) | 35.00 |
| HX-868[b] | 1.50 |
| A.O. 2246[c] | 0.15 |

TABLE XII-continued

| COMPOSITION OF LINER A-128A | |
|---|---|
| Ingredient | Wt. Percent |
| R-45M/TDI*[d] | 21.35 |

*Curative to polymer to give a 2.0 equivalent NCO:OH ratio.
[a] A hydroxy terminated polybutadiene material from Arco Chemical.
[b] A bonding agent catalyst available from 3-M Company.
[c] An antioxidant available from American Cyanamid.
[d] A blend of (a) and toluene diisocynate from E. I. Dupont de Nemours & Co.

Table XIII shows results of using the A-128 with the elastomer compositions of Example 1 and 4 as set forth above in the Example 5.

TABLE XIII

BOND DATA BETWEEN LINED WITH A-128A AND PROPELLANT MG-819 (LCA-9843)*

| Test Temp., F. | Tensile Bond, psi** | | | 90 Degree Peel, pli** |
|---|---|---|---|---|
| | #1 | #2 | #3 | |
| −65 | 642[a] | 568[b] | 427[b] | 85[b] |
| 77 | 177[b] | 140[a] | 177[b] | 5 to 6[b] |
| 165 | 82[a] | 138[b] | 95[a] | 3.8[b] |

*88 percent solids with 20 percent Al
**0.2/in./min X-head
[a] Failed primarily in liner
[b] Failed in propellant

SIX-INCH SRL MOTOR

To verify the applicability of the above non-asbestos SRL system to case bonded, end burning motors, six-inch test motors were fabricated and tested. Fabrication entailed the lining of a six-inch test motor with the SRL system. The procedure for forming the SRL is given in Table XIV. After the SRL was installed in the case, the barrier film (composition of Example 1) was lined with A-128A (Table XII) to a thickness of between 10 and 15 mils. Lining was accomplished by spraying the interior of the SRL with the A-128A diluted with chloroethane (2 to 1 by volume). After flashing the liner two hours (minimum) at 145° F., the SRL insulated case was vacuum cast with a proprietary propellant. The cast propellant grain was cured 96 hours at 145° F. Following grain cure and cool down to 77 F., attempts were made to vent the SRL system; however, the SRL was 11.5 inches long, while the grain was only 9 inches long, and thus left over an inch of SRL extending beyond the ends of the grain. Shrinkage of the grain was not sufficient to separate the extended ends of the SRL to affect venting. Cooling the grain to −40° F. was attempted to induce sufficient shrinkage; but this, too, provided unsuccessful. Finally, radial slots were cut in the insulator layer of the SRL down to the separator sheet. The slots ($\frac{1}{4} \times 2$ inches) were located approximately $\frac{1}{4}$ inch from the aft end of the grain and $\frac{1}{2}$ inch from the forward end of the grain and were spaced approximately one inch apart, radially. The slotting operation yielded the desired venting. Dry nitrogen could be easily flowed through the SRL (aft to forward) at 15 psia.

After X-ray of the grain for defects, the forward end of the grain was inhibited with a $\frac{3}{8}$ thick layer of inhibitor (see Table XV), which was allowed to cure overnight (16 hours) at 77 F. A 25 gram wafer igniter containing 25 grams of a pyrotectnic ignitor was attached to the aft grain surface, then motor assembly was completed by attaching the forward head and nozzle to the motor.

Post-firing examination revealed an even burnout on the aft grain inhibitor. The insulation was still intact

TABLE VIII

| Ingredient, phr | C1 | C2 | C3 | C4 | C5 | C6 | G | E | H |
|---|---|---|---|---|---|---|---|---|---|
| Chlorosulfonated Polyethylene[a] | 100.0 | 100.0 | 100.0 | 100.0 | 100.0 | 100.0 | | | |
| Magnesia | 6.0 | 4.0 | 6.0 | 6.0 | 6.0 | 6.0 | | | |
| Dipentamethylene thiurum hexa sulfide[b] | 2.0 | 2.0 | 2.0 | 2.0 | 2.0 | 2.0 | | | |
| Starch, Corn | 40.0 | 10.0 | 40.0 | 100.0 | 40.0 | 40.0 | | | |
| Cotton Flock | 40.0 | — | 40.0 | 40.0 | 100.0 | — | | | |
| Phenolic Resin[c] | 100.0 | — | 60.0 | 60.0 | 60.0 | 100.0 | | | |
| Sisal, ¼" Fiber | | | | | | 40.0 | | | |
| EPDM[d] | | | | | | | 100.0 | 100.0 | |
| 2,5 dimethyl-2,5-di(t-butylperoxy)hexane[e] | | | | | | | 7.5 | 2.5 | |
| Asbestos | | | | | | | 100.0 | 20.0 | |
| Linear polybutadiene[f] | | | | | | | 10.0 | — | |
| Antimony Oxide | | | | | | | | 20.0 | |
| Flame retardant[g] | | | | | | | | | 40.0 |
| Asbestos Felt | | | | | | | | | 300 |
| Phenolic Resin | | | | | | | | | 100 |
| Erosion/Decomposition Rate, mils/sec at: | | | | | | | | | |
| 0.245 lbs/sec in$^2$ | 6.7 | — | 8. | 7.2 | 9. | 12 | — | 11 | 7 |
| Mechanical Properties (77 F., 20 in./min X-head) | | | | | | | | | |
| εm, % | 20 | 475 | 50 | 10 | 10 | 10 | 29 | 63 | 1.15 |
| σm, psi | 2811 | 3006 | 1972 | 2426 | 3132 | 3018 | 2279 | 360 | 45000 |

[a] Hypalon LD-999 ®
[b] Tetron A ®
[c] Resinox 755 ®
[d] Nordel 1040 ®
[e] Varox ®
[f] Butarez CTL II ®
[g] Dechlorane Plus ®

Table IX shows results of plasticizer absorption tests of elastomers of this invention compared to an analogous asbestos containing compositions wherein the formulations for A, B, C, D and F are shown in Table V.

TABLE IX

| Insulator | Test Temp., F. | Plasticizer Absorption After 120 Hour, Percent | | | |
|---|---|---|---|---|---|
| | | CLO[1] | IDP[2] | DOA[3] | 3GH[4] |
| F | 77 | 67 | 119 | 10 | 42 |
| | 145 | 192 | 130 | 34 | 60 |
| A | 77 | 95 | 88 | −1.7 | 15 |
| | 145 | 124 | 182 | −2.7 | 57 |
| B | 77 | 62 | 68 | 4 | 23 |
| | 145 | 125 | 86 | 8 | 43 |
| C | 77 | | 4 | | 5 |
| | 145 | | 16 | | 22 |
| D | 77 | 1.5 | 7 | 8 | 9 |
| | 145 | 9 | 21 | 28 | 29 |
| | | Polarity Increase ⟶ | | | |

[1] Circo Light Oil ®
[2] Isodecyl Pelargonate
[3] Dioctyl Adipate
[4] Flexol 3GH ®

Table X shows results of bonding of elastomer materials of this invention (A,B,C and D as in Table V) in the presence or absence of A-128, a liner material prepared as in Example 5 (Table XII) to a standard propellant composition containing hydroxy terminated polybutadiene as a binder material. Results from bonding of Composition H (Table V) are also shown.

TABLE X

| Insulator System | Test Temp. | Tensile Bond Strengths, psi | | |
|---|---|---|---|---|
| | | #1 | #2 | #3 |
| D | −65 | 353 (CP) | 413 (CP) | 416 (CP) |
| | 77 | 44 (M) | 18 (A) | 44 (M) |
| | 165 | 21 (A) | 19 (A) | 10 (A) |
| D + A-128 | −65 | 489 (CP) | 381 (CP) | — |
| | 77 | 95 (CP) | 77 (CP) | 107 (CP) |
| | 165 | 66 (CP) | 65 (CP) | 69 (CP) |
| A | −65 | 475 (CP) | 566 (CP) | 489 (CP) |
| | 77 | 89 (CP) | 99 (CP) | 94 (CP) |
| | 165 | 81 (CP) | 74 (CP) | 69 (CP) |
| A + A-128 | −65 | 485 (CP) | 378 (CP) | — |
| | 77 | 119 (CP) | 117 (CP) | 107 (CP) |
| | 165 | 68 (M) | 85 (CP) | 70 (M) |
| C | −65 | 288 (A) | 268 (A) | |
| | 77 | 20 (A) | 11 (A) | 18 (A) |
| | 165 | — | 10 (A) | 5 (A) |
| C + A-128 | −65 | 559 (CP) | 483 (CP) | 552 (CP) |
| | 77 | 70 (CP) | 110 (CP) | 105 (CP) |
| | 165 | 67 (CP) | 86 (CP) | 65 (CP) |
| D | −65 | 358 (A) | 402 (A) | 282 (A) |
| | 77 | 24 (A) | 28 (A) | 43 (A) |
| | 165 | 27 (A) | — | 27 (A) |
| D + A-128 | −65 | 534 (CP) | 485 (CP) | 565 (CP) |
| | 77 | 101 (CP) | 101 (CP) | 98 (CP) |
| | 165 | 61 (CP) | 68 (CP) | 69 (CP) |
| H | −65 | 424 (M) | 520 (M) | — |
| | 77 | 98 | 89 | 101 |
| | 165 | 71 (M) | 74 (M) | 74 (M) |

A = Failed adhesively in bond
CP = Failed Cohesively in propellant
M = Mixed failure at the bond and in the propellant

EXAMPLE 5

This example illustrates use of elastomer compositions of this invention in the specific application of stress relieving liners (SRL) for end burning or highly stressed internal burning propellant grains. (The princiwith virgin insulation still remaining over columns and separator sheet, even at the aft end of the SRL lay-up.

TABLE XIV
PROCEDURE FOR FORMING SRL IN SIX-INCH TEST MOTOR

1. Grit blast I.D. of motor case - clean with 1,1,1-Trichloroethane
2. Prime I.D. of motor case with Chemlok 233
3. Flash Chemlok 233 for 30 minutes minimum at 77 F.
4. Wrap bladder mandrel with one layer of 0.030 inch thick sheet of a composition prepared as in Example 4.
5. Cold flow the layer of step 4 to I.D. of motor case using 100 psig nitrogen pressure in bladder.
6. Install perforated silicone separator sheet over the layer of step 5.
7. Fill perforations in separator sheet with discs of the composition 4D (TABLE XI) (discs = 0.5 inches in diameter by 0.2 inches thick)
8. Wrap bladder mandre with one wrap of 0.032 inch thick of the composition of Example 1 followed by 2 wraps of 0.025 inch thick of the composition of Example 4.
9. Insert wrapped bladder into I.D. of motor case - apply 100 psig nitrogen pressure.
10. Cure, under pressure, for 2.5 hours at 350 F.
11. Remove mandrel
12. Grit blast I.D. of the inner layer 8 prepared from the composition of Example 1.
13. Post cure 9 hours of 250 F.

TABLE XV
COMPOSITION AND PROPERTIES INHIBITOR

| Ingredient | phr | Wt. % |
|---|---|---|
| R-45M$^{(a)}$ | 100.000 | 29.795 |
| IDP (Isodecyl Pelargonate)$^{(b)}$ | 25.000 | 7.449 |
| Mannitol$^{(c)}$ | 200.000 | 59.591 |
| HX-868$^{(d)}$ | 2.500 | 0.745 |
| HMDI$^{(e)}$ | 6.600 | 1.966 |
| A.O. 2246 | 1.500 | 0.477 |
| FeAA$^{(g)}$ | 0.025* | 0.007 |
| | | 100.000 |

| | Mechanical Properties | | |
|---|---|---|---|
| Test Temp. | εm, % | σm, psi | E, psi |
| −65 F. | 144 | 558 | 1730 |
| −45 F. | 127 | 362 | 1270 |
| 77 F. | 107 | 88 | 304 |
| 170 F. | 51 | 77 | 254 |

$T_g$ −116 F.
Thermal Expansion, in./in./°C. 21.7 × $10^{-5}$

*FeAA content can be adjusted to regulate pot life.
$^{(a)}$A hydroxy terminated polybutadiene available from Arco Chemical Co.
$^{(b)}$A plasticizer available from Emery Industries.
$^{(d)}$A bonding agent, available from 3-M Company.
$^{(e)}$An isocyanate available from Mobby Chemical Company
$^{(f)}$An antioxidant available from American Cyanamid.

EXPERIMENTAL

Uniaxial mechanical properties of insulators of this Example 5 were obtained in accordance with ASTM method D412-68. Tests were conducted on an Instron Tensile Tester using a crosshead speed of 20 in./min. For propellant mechanical properties, Class "C" type tensile specimens were employed having an effective gauge length of 2.7 inches. Test temperatures and strain rates were varied to yield time-temperature response spectrum.

Triaxial tensile tests were conducted using the four-inch specimens. The specimens used had 0.5-inch diameter columns by 0.188 inches long. Column area was maintained at 50 percent of the total SRL bond surface. Testing was conducted at two different temperatures and strain rates to provide data for stress analysis.

Tensile bond and 90 degree peel bond data were obtained by pulling the appropriate specimens on an Instron Tensile Tester at crosshead speeds of 0.2-in./min. Tensile bond specimens were 1.5 inch diameter triaxial specimens (tensile buttons) containing layers of insulator and propellant. Peel specimens consisted of one inch wide propellant blocks (1×1×3 inches) with insulator bonded to one face. Bonding was effected by casting and curing propellant onto lined (with A-128A) glass reinforced panels (6×6 inches) of insulators.

What is claimed is:

1. A method of insulating a rocket motor, which comprises lining said rocket motor or portion thereof with non-asbestos elastomeric insulation material comprising:
   100 parts by weight of a crosslinked elastomer polymer;
   between about 10 and 75 parts by weight of a char forming organic fiber selected from cotton flock, Sisal and a combination of cotton flock and Sisal.
2. A method in accordance with claim 1, wherein said elastomeric insulation material includes between about 100 and 30 parts by weight silica.
3. A method in accordance with claim 1, wherein said elastomeric insulation material is free of silica.
4. A method in accordance with claim 1, 2, or 3 wherein said elastomer polymer consists essentially of EPDM.
5. A method in accordance with claim 1, 2 or 3 wherein said elastomer polymer consists essentially of chlorosulfonated polyethylene.
6. A method in accordance with claim 4, wherein said organic fiber consists essentially of cotton flock.
7. A method in accordance with claim 4, wherein said organic fiber consists essentially of Sisal.
8. A method in accordance with claim 5, wherein said organic fiber consists essentially of cotton flock.
9. A method in accordance with claim 5, wherein said organic fiber consists essentially of Sisal.
10. A method of insulating a rocket motor, which comprises forming a liner for said rocket motor or portion thereof from non-asbestos elastomeric insulation material comprising:
    100 parts by weight chlorosulfonated polyethylene;
    between about 15 and 60 parts by weight of cotton flock;
    between about 0 and 30 parts by weight silica;
    between about 0 and 150 parts by weight of an organic polymer material consisting essentially of phenolic resin;
    between about 20 and 60 parts by weight starch;
    between about 1 and 15 parts by weight curing agent selected from metal oxide and an accelerator.
11. A method of insulating a rocket motor, which comprises forming a liner for said rocket motor or portion thereof from non-asbestos elastomeric insulation material comprising:
    100 parts by weight EPDM;
    between about 15 and 60 parts by weight cotton flock;
    between about 0 and 30 parts by weight silica;
    between about 0 and 30 parts by weight antimony oxide;
    between about 0 and 20 parts by weight of an organic polymer material consisting essentially of liquid polybutadiene;
    between about 1 and 5 parts by weight of a peroxide crosslinker for said EPDM.

12. A method in accordance with claim 10 or 11 wherein said silica is between about 10 and 30 parts by weight.

13. A method in accordance with claim 10 or 11 wherein said elastomeric insulation material is free of silica.

14. A method in accordance with claim 10 or 11 wherein said elastomeric insulation material includes between about 1 and 20 parts by weight polybutadiene.

* * * * *

UNITED STATES PATENT AND TRADEMARK OFFICE
CERTIFICATE OF CORRECTION

PATENT NO. : 4,507,165
DATED : March 26, 1985
INVENTOR(S) : Liles G. Herring

It is certified that error appears in the above-identified patent and that said Letters Patent are hereby corrected as shown below:

Column 18, line 23 of Claim 2;

"100 and 30"  should read  --10 and 30--

Column 15, line 18;
"confirguration" should read --configuration--

Signed and Sealed this

Twenty-third Day of July 1985

[SEAL]

Attest:

DONALD J. QUIGG

Attesting Officer    Acting Commissioner of Patents and Trademarks